(12) United States Patent
Reiners et al.

(10) Patent No.: US 11,703,375 B2
(45) Date of Patent: Jul. 18, 2023

(54) WEIGHING SENSOR HAVING A CALIBRATION WEIGHT ASSEMBLY

(71) Applicant: Minebea Intec Aachen GmbH & Co. KG, Aachen (DE)

(72) Inventors: Volker Reiners, Aachen (DE); Wassim Alyassin, Aachen (DE)

(73) Assignee: MINEBEA INTEC AACHEN GMBH & CO. KG

( * ) Notice: Subject to any disclaimer, the term of this patent is extended or adjusted under 35 U.S.C. 154(b) by 272 days.

(21) Appl. No.: 17/097,806

(22) Filed: Nov. 13, 2020

(65) Prior Publication Data

US 2021/0140813 A1 May 13, 2021

(30) Foreign Application Priority Data

Nov. 13, 2019 (DE) ...................... 10 2019 130 625.6

(51) Int. Cl.
*G01G 23/01* (2006.01)
*G01G 21/24* (2006.01)

(52) U.S. Cl.
CPC ......... *G01G 23/012* (2013.01); *G01G 21/244* (2013.01)

(58) Field of Classification Search
CPC ........................... G01G 21/244; G01G 23/012
See application file for complete search history.

(56) References Cited

U.S. PATENT DOCUMENTS

| | | | | |
|---|---|---|---|---|
| 5,866,854 A * | 2/1999 | Emery | ................. | G01G 23/012 177/229 |
| 6,194,672 B1 * | 2/2001 | Burkhard | ............. | G01G 21/244 73/1.13 |
| 6,232,567 B1 * | 5/2001 | Bonino | ................ | G01G 21/244 177/229 |
| 6,365,847 B1 * | 4/2002 | Muller | ..................... | G01G 7/02 177/210 EM |
| 7,975,526 B2 | 7/2011 | Genoud et al. | ................. | 73/1.13 |
| 8,581,121 B2 | 11/2013 | Burkhard et al. | .............. | 177/50 |
| 2002/0050412 A1 * | 5/2002 | Emery | ................. | G01G 23/012 177/256 |
| 2004/0003948 A1 * | 1/2004 | Kuhlmann | ........... | G01G 23/012 177/132 |
| 2007/0034422 A1 * | 2/2007 | Genoud | ............... | G01G 23/012 177/211 |

(Continued)

FOREIGN PATENT DOCUMENTS

| | | | | |
|---|---|---|---|---|
| DE | 19540782 | 12/1996 | ............. | G01G 21/24 |
| DE | 100 07 267 | 7/2001 | ............... | G01G 7/02 |

(Continued)

Primary Examiner — Natalie Huls
(74) Attorney, Agent, or Firm — Hayes Soloway P.C.

(57) ABSTRACT

A weighing sensor for a scale, includes a mainland body, a load receiver articulated on the mainland body by parallelogram guiding, and a lever mechanism having at least two levers which are supported on the mainland body by supporting joints, a first lever being arranged closer to a load receiver than a second lever, and the at least two levers being connected to each other via coupling rods and load joints, a calibration weight assembly including a calibration weight rest and a calibration weight being arranged on one lever, the calibration weight rest being connected to at least one coupling element.

17 Claims, 3 Drawing Sheets

(56) References Cited

U.S. PATENT DOCUMENTS

| | | | | |
|---|---|---|---|---|
| 2011/0147099 A1* | 6/2011 | Burkhard | ............... | G01G 21/00 |
| | | | | 177/246 |
| 2013/0233045 A1* | 9/2013 | Burkhard | ................. | G01G 7/04 |
| | | | | 73/1.13 |
| 2020/0191641 A1* | 6/2020 | Burkhard | ............. | G01G 23/012 |
| 2021/0199491 A1* | 7/2021 | Liu | ...................... | G01G 23/012 |

FOREIGN PATENT DOCUMENTS

| | | | | |
|---|---|---|---|---|
| DE | 100 24 017 | 7/2001 | ............... | G01G 7/02 |
| DE | 100 45 136 | 3/2002 | ............. | G01G 21/24 |
| EP | 1873504 | 2/2008 | ............. | G01G 23/01 |
| EP | 2 336 736 | 12/2009 | ........... | G01G 21/100 |
| EP | 2 434 264 | 9/2010 | ............. | G01G 21/24 |

\* cited by examiner

WEIGHING SENSOR HAVING A CALIBRATION WEIGHT ASSEMBLY

FIELD OF THE INVENTION

A weighing sensor for a scale, comprising a mainland body, a load receiving means articulated on the mainland body by means of parallelogram guiding, and a lever mechanism having at least two levers which are supported on the mainland body by means of supporting joints, a first lever being arranged closer to a load receiving means than a second lever, and the at least two levers being connected to each other via coupling rods and load joints, a calibration weight assembly comprising a calibration weight rest and a calibration weight being arranged on one lever.

TECHNICAL BACKGROUND

Weighing sensors sense the force applied to the load receiving means of the weighing sensor. Typically, weighing sensors have a monolithic structure in which the essential components of the weighing sensor, in particular at least the mainland body, the load receiving area and the parallelogram control arms, are machined in one piece from a block of material. These weighing sensors have a load receiving means which is connected, for example, to a weighing pan, and a mainland body which is connected to a fixed area, in particular a carriage housing. The force to be measured is introduced into the load receiving means. Appropriate weighing sensors work according to the principle of electromagnetic force compensation.

To guarantee a high measuring accuracy and repeatability of a measurement, weighing sensors which work according to the principle of electromagnetic force compensation often have a calibration weight assembly. A calibration weight having a defined mass is connected to a lever of the weighing sensor to determine a reference value. Further weighing parameters can be adjusted on the basis of the reference value.

Document DE 195 40 782 C1 discloses weighing sensor which is to be manufactured from a monolith and has two transmission levers configured as bent levers. One of the transmission levers extends in the direction of gravity. The vertical alignment, i.e. the alignment in the direction of gravity, is disadvantageous, as a high design is obligatory if high reduction ratios are to be achieved.

Document P 1 873 504 A1 describes a calibration weight arrangement for an electronic scale, the calibration weight arrangement being connected to the first lever. The disadvantage of this arrangement is that the calibration weight arrangement is directly connected to the lever system. Therefore, the position of the calibration weight arrangement is determined by the direction of the force.

SUMMARY

It is therefore the object of the invention to provide a weighing sensor which eliminates or at least reduces the known disadvantages of the prior art.

This object is achieved with a weighing sensor of the type mentioned above in that the calibration weight rest is connected to at least one coupling element, in particular to two coupling elements which are arranged on opposite sides of the lever mechanism. Due to the connection of the calibration weight rest to the at least one coupling element, the calibration weight rest is not directly connected to a lever of the weighing sensor.

In a further configuration, the at least one coupling element is connected to the mainland body via a supporting joint and connected to a lever via a coupling rod. It is thus possible that a reversal of the direction of the force is caused by the coupling element. Thus, the calibration weight rest can be placed on any lever, the last lever of the lever mechanism or the compensation lever moving in a direction opposite a load direction or opposite the direction of gravity due to a possible reversal of the force direction of the coupling element. Therefore, when the calibration weight is placed on the calibration weight rest, the last lever moves in a direction opposite the load direction.

In a further configuration, the coupling rod of the coupling element is loaded in compression. In particular, the at least one coupling element is a one-sided lever. This causes a reversal of the direction of force, the pivot point being shifted via a supporting joint, and the direction of force being reversed. Alternatively, the coupling rod of the coupling element can be loaded in tension. For this purpose, the coupling element is configured as a two-sided lever.

In a further configuration, the calibration weight rest is connected via the at least one coupling element to the second lever and/or the last lever of the lever mechanism, a magnet pot being arranged on the last lever. In other words, the calibration weight rest is not connected to the first lever but to a lever which is arranged after the first lever in the lever mechanism. Thus, the calibration weight rest can also be connected to a fourth or fifth lever, if the lever mechanism of the weighing sensor has a corresponding number of levers. The advantage is that the calibration weight can have a smaller mass and thus the calibration weight assembly can be designed smaller and lighter.

In a further configuration, the calibration weight rest runs outside the weighing sensor and has in particular a U-shaped geometry. Therefore, the load cell is not weakened by additional apertures for the calibration weight rest, and the lever arrangement and the lever geometry do not have to be changed.

In a further configuration, the at least one coupling element is monolithically connected to the lever mechanism. The coupling element is thus part of the weighing sensor and is milled along with the remaining lever mechanism. Therefore, no additional manufacturing steps are necessary.

In a further configuration, at least one spacer is arranged between the coupling element and the calibration weight rest. This allows the distance between the coupling element and the calibration weight rest to be adjusted. The calibration weight rest can thus have the same geometrical dimensions, and an appropriate spacer can be selected depending on the arrangement of the at least one coupling element in the lever mechanism. In addition, the spacer facilitates the assembling of the calibration weight assembly to the weighing sensor, as the coupling element is preferably located in the immediate vicinity of a lever and is thus arranged inwardly offset from the outer limiting surfaces of the weighing sensor.

In a further configuration, the calibration weight rest is non-positively connected to the coupling element. Therefore, the calibration weight rest can be easily replaced even in the event of a defect without having to replace the complete weighing sensor. Furthermore, this also saves production costs, since a lot of material would have to be milled away in the case of monolithic production of the calibration weight rest with the weighing sensor.

BRIEF DESCRIPTION OF THE FIGURES

Further advantageous aspects will become apparent from the description below of preferred example embodiments with reference to the drawings, in which.

DETAILED DESCRIPTION OF THE EXAMPLE EMBODIMENTS

Figure 1:
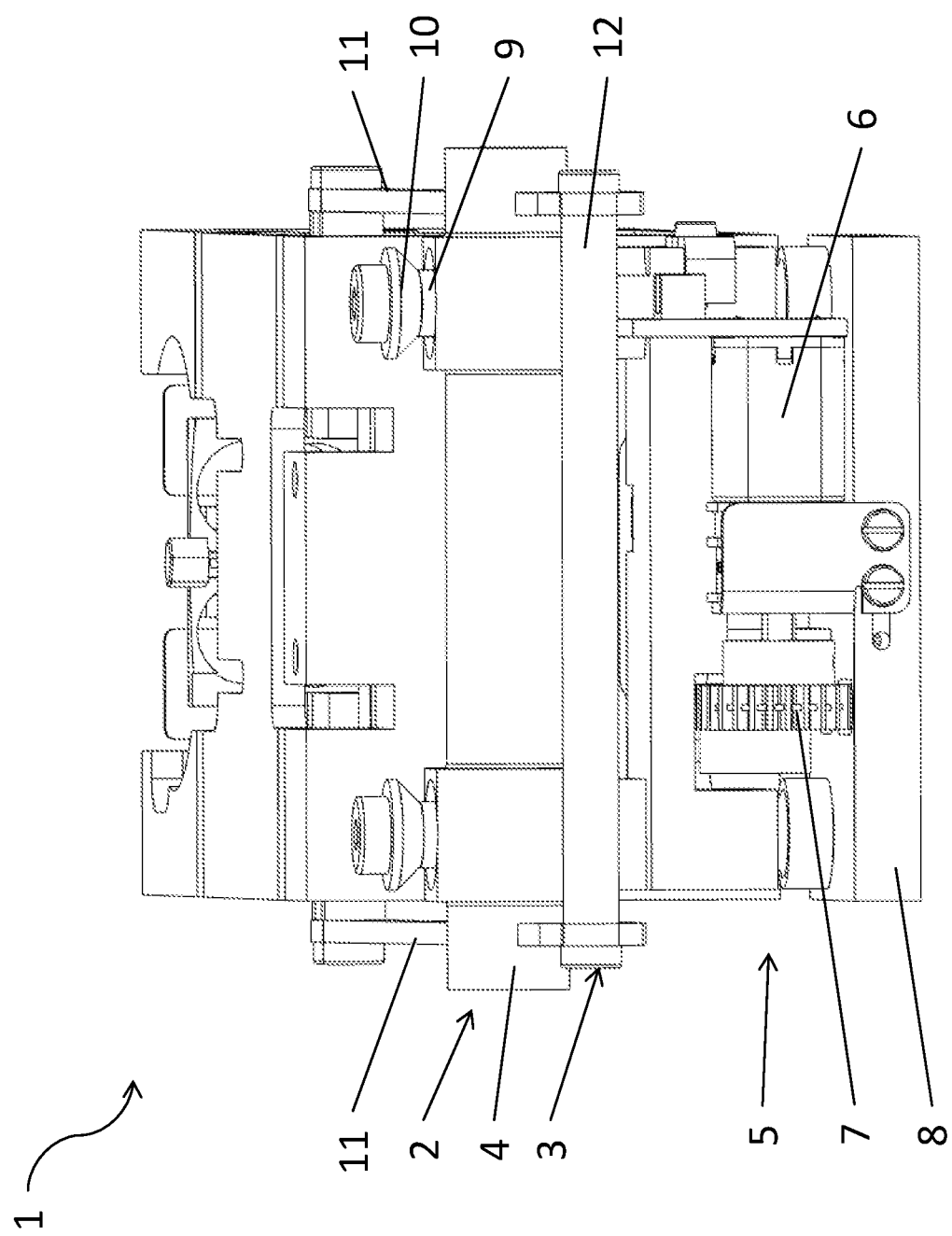
FIG. 1 is a schematic diagram of a weighing sensor having a calibration weight assembly

FIG. 1 shows a schematic diagram of a weighing sensor 1 having a calibration weight assembly 2 according to an example embodiment. The calibration weight assembly 2 has a calibration weight rest 3 and a calibration weight 4. The calibration weight 4 is raised and lowered by a transfer mechanism 5. When the calibration weight 4 is lifted by the transfer mechanism 5, the calibration weight 4 is not in contact with the calibration weight rest 3. When the calibration weight 4 is lowered by the transfer mechanism 5, it rests on the calibration weight rest 3, and the weighing sensor can be calibrated by determining a reference value using the calibration weight assembly 2.

The transfer mechanism 5 is composed of a motor 6 which drives an eccentric via at least one gear wheel 7. The eccentric raises or lowers the calibration weight 4. The transfer mechanism 5 is connected to a base plate 5. The base plate 8 is also provided with two guide rods 9, which serve to guide the calibration weight 4. An upper stop 10 which specifies the lifting height of the calibration weight 4 is arranged on each of the guide rods 9.

The calibration weight rest 3 consists of two guide rods 11 which have an L-shaped geometry, and of a connecting rod 12 which connects the two guide rods 11 to each other. The connecting rod 2 in particular has a cylindrical geometry. The connecting, rod 12 is preferably screwed to the two guide rods 11. To this end, the connecting rod 12 has at least one threaded hole. The threaded hole can be configured either as a through hole or as a blind hole. In case of a blind hole, at least two holes must be provided in the connecting rod 12, the two threaded holes being located at opposite ends of the connecting rod 12.

Figure 2:
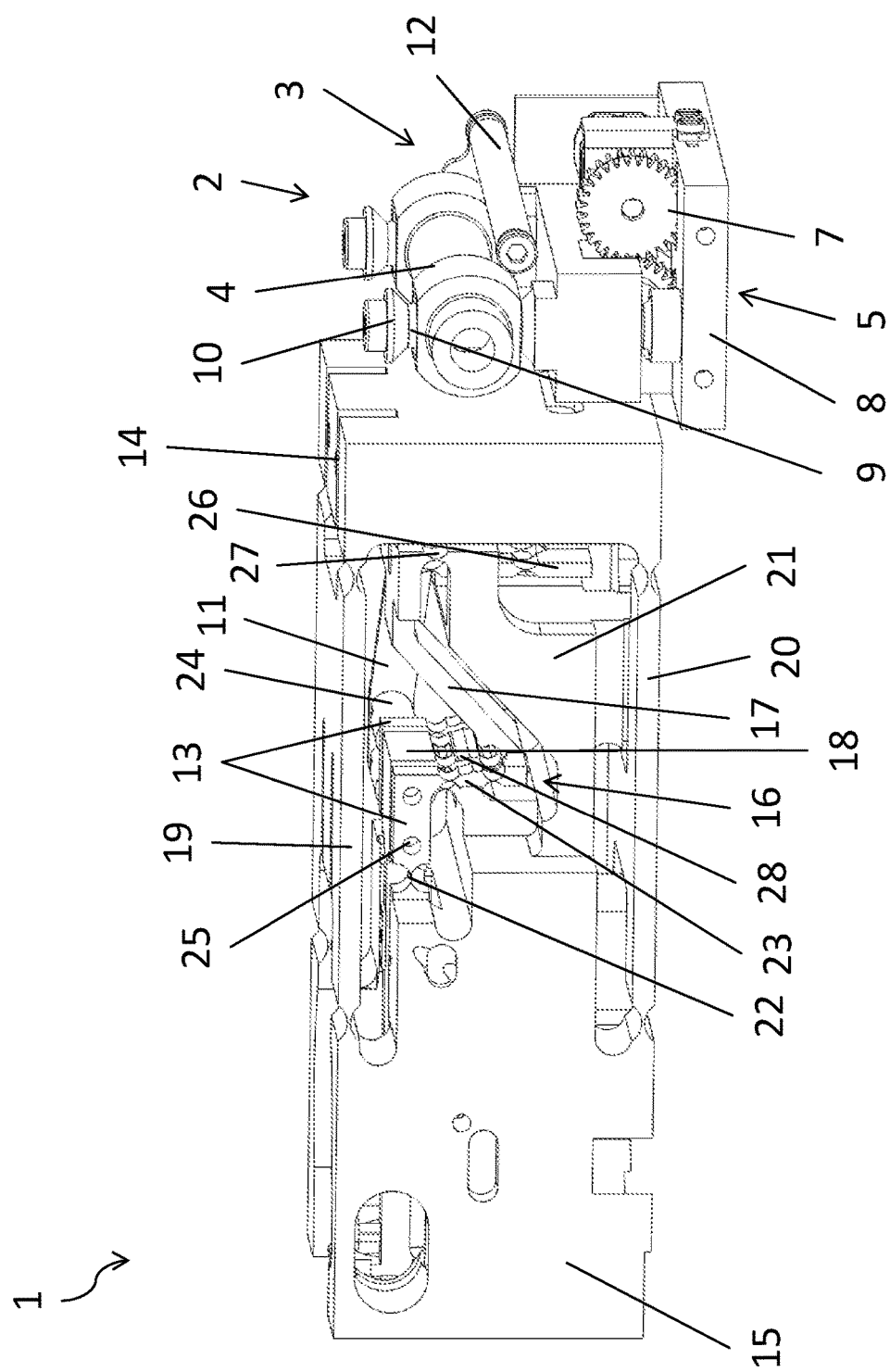
FIG. 2 is a further schematic diagram of the weighing sensor

FIG. 2 shows a further schematic diagram of the weighing sensor 1. In the calibration weight assembly 2, a guide rod 11 of the calibration weight rest 3 is hidden. The weighing sensor 1 comprises a load receiving means 14, a mainland body 15, a lever mechanism 16 having at least two levers 17, 18, a first ever 17 being arranged closer to the load receiving means 14 than a second lever 18. The second lever 18 is also referred to as compensation lever 18 if it is the last lever 17, 18 of the lever mechanism 16, and a coil which is influenced by a magnet is arranged at the end thereof. Furthermore, a slit diaphragm which is required for determining the position of the compensation lever 18 is arranged on the compensation lever 18, Furthermore, the weighing sensor 1 has a parallelogram guiding, which is connected to the mainland body 15 and to the load receiving means 14 and is composed of a first parallelogram control arm 19 and a second parallelogram control arm 20. The levers 17, 18 are supported by supporting joints on a projecting part 21 of the mainland body 15.

The calibration weight 4 and the transfer mechanism 5 are located in front of the load receiving means 14. The guide rods 11 of the calibration weight rest 3 run laterally outside the weighing sensor 1, The guide rods 11 are connected to the last lever 18 or to the compensation lever 18 via coupling elements 13. The coupling element 13 has a supporting joint 22, which is supported on the mainland body 15. Furthermore, the coupling element 13 is connected to the compensation lever 18 via a coupling rod 23. A gap is arranged between the coupling rod 23 of the coupling element 13 and the coupling rod of the compensation lever 18.

At least one spacer 24, preferably two spacers 24 are respectively arranged between the guide rods 11 and the respective coupling element 13. The spacers 24 preferably have a cylindrical geometry. Furthermore, a through hole is arranged in the spacers 24. This allows the guide rods 11 to be connected to the respective coupling element 13 by means of a screw connection, For this purpose, the coupling element 13 has at least one, preferably two threaded holes 25, which can be configured either as a blind hole or as a through hole.

Due to the supporting joint 22 of the coupling element 13 and the arrangement of the coupling rod 23 on the coupling element 13, the coupling element 13 acts like a one-sided lever. As a result, the coupling rod 23 is loaded in compression and can thus have a smaller wall thickness than a coupling rod 23 loaded in tension. When the calibration weight 4 rests on the calibration weight rest 3, the guide rods 11 of the calibration weight rest 3 are pulled downwards in the direction of gravity. As the calibration weight rest 3 is connected to the compensation lever 18 and the compensation lever 18 is a two-sided lever, the compensation lever 18 would also be moved in the direction of gravity without the coupling element 13. Due to the coupling element 13, the compensation lever 18 is moved in a direction opposite the direction of gravity.

The lever mechanism 16 is connected to the load receiving means 14 via at least one coupling joint, at least one first coupling rod 26 and at least one load joint. The first coupling rod 26 is divided, into two coupling rods 26 which run parallel next to each other in the vertical direction. The coupling rods 26 are connected to the load receiving means 14 via a load transfer element. Both the projecting part 21 of the mainland body 15 and the first lever 17 have a ramp-shaped course.

Both the first coupling rod 26, which connects the load receiving means 14 to the first lever 17, and the second coupling rod 28, which connects the first lever 17 and the compensation lever 18. are vertically arranged coupling rods 26, 28.

Figure 3:
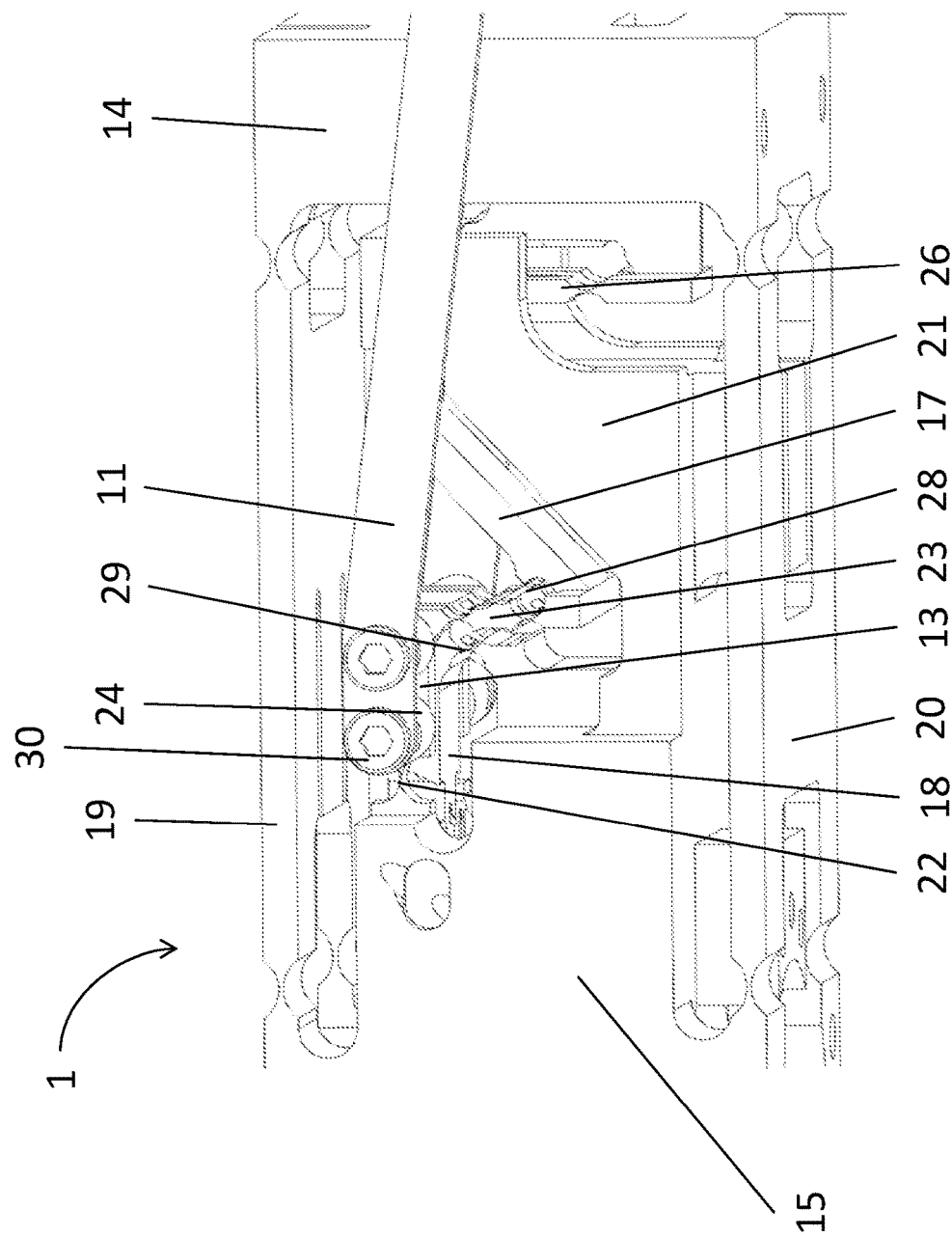
FIG. 3 shows a detail of the weighing sensor

FIG. 3 shows a detail of the weighing sensor 1, in which the lever mechanism 16, the load receiving means 14 and a part of the mainland body 16 can be seen. The compensation lever 18 is connected via a supporting joint 29 to the mainland body 15, in particular to the projecting part 21 of the mainland body 15. The compensation lever 18 is a two-sided lever which is connected to the first lever 17 via the second coupling rod 28 and to the coupling element 13 via the coupling rod 23 of the coupling element 13. The guide rod 11 of the calibration weight assembly 2 is connected to the coupling element 13. If the guide rod 11 was directly connected to the compensation lever 18, the compensation lever 18 would be pulled downwards in the direction of gravity due to the arrangement of the screws 30 when the calibration weight 4 is placed on the calibration weight rest 3, because at least one of the screws 30 is located behind the supporting joint 29 of the compensation lever 18. However, the compensation lever 18 should move upwards, in a direction opposite the direction of gravity. Due to the connection of the guide rod 11 to the coupling element 13, which is a one-sided lever, the coupling element is pulled downwards, in the direction of gravity, and the coupling rod 23 of the coupling element 13 is loaded in compression, This causes the second coupling rod 28 of the compensation lever 18 to move in the direction of gravity, and the compensation lever 18 to move in a direction opposite the direction of gravity.

List of Reference Numerals
1 weighing sensor
2 calibration weight assembly
3 calibration weight rest
4 calibration weight
5 transfer mechanism
6 motor
7 gear wheel
8 base plate
9 guide rod
10 upper stop
11 guide rod
12 connecting rod
13 coupling element
14 load receiving means
15 mainland body
16 lever mechanism
17 first lever
18 second lever/compensation lever
19 first parallelogram control arm
20 second parallelogram control arm
21 projecting part of the mainland body
22 supporting joint coupling element
23 coupling rod coupling element
24 spacer
25 threaded hole
26 first coupling rod lever mechanism
27 supporting joint first lever
28 second coupling rod ever mechanism
29 supporting joint compensation lever
30 screw

The invention claimed is:

1. A weighing sensor for a scale, comprising a mainland body, a load receiver articulated on the mainland body by parallelogram guiding, and a lever mechanism having at least two levers which are supported on the mainland body by supporting joints, a first lever being arranged closer to a load receiver than a second lever, and the at least two levers being connected to each other via coupling rods and load joints, a calibration weight assembly comprising a calibration weight rest and a calibration weight being arranged on one lever, wherein the calibration weight rest is connected to at least one coupling element, wherein the calibration weight and a transfer mechanism for the calibration weight are arranged in front of the load receiver,
wherein the transfer mechanism raises and lowers the calibration weight, and
wherein the calibration weight rests on the calibration weight rest in a lowered state and has no contact with the calibration weight rest in a raised state.

2. The weighing sensor according to claim I, wherein the at least one coupling element is connected to the mainland body via a supporting joint.

3. The weighing sensor according to claim 2, wherein the calibration weight rest is connected via one or more of the following:
the coupling element, a coupling rod of the coupling element and a coupling rod of the second lever,
(b) the last lever to the second lever, and
(c) last lever of the lever mechanism, a coil being arranged on the last lever.

4. The weighing sensor according to claim 2, wherein the at least one coupling element is a one-sided lever.

5. The weighing sensor according to claim 2, wherein the calibration weight rest runs outside the weighing sensor.

6. The weighing sensor according to claim 1, wherein the at least one coupling element is connected to a lever via a coupling rod.

7. The weighing sensor according to claim 6, wherein the coupling rod is loaded in compression.

8. The weighing sensor according to claim 1, wherein the calibration weight rest is connected via one or more of the following:
(a) the coupling element, a coupling rod of the coupling element and a coupling rod of the second lever,
(b) the last lever to the second lever, and
(c) the last lever of the lever mechanism, a coil being arranged on the last lever.

9. The weighing sensor according to claim 1, wherein the at least one coupling element is a one-sided lever.

10. The weighing sensor according to claim 1, wherein the calibration weight rest runs outside the weighing sensor.

11. The weighing sensor according to claim 1, wherein the calibration weight rest has a U-shaped geometry.

12. The weighing sensor according to claim 1, wherein a last lever moves in a direction opposite the load direction upon placement of the calibration weight.

13. The weighing sensor according to claim 1, wherein the at least one coupling element is monolithically connected to the lever mechanism.

14. The weighing sensor according to claim 1, wherein at least one spacer is arranged between the at least one coupling element and the calibration weight rest.

15. The weighing sensor according to claim 1, wherein the calibration weight rest is non-monolithically connected to the at least one coupling element.

16. The weighing sensor according to claim 2, wherein the at least one coupling element is connected to a lever via a coupling rod.

17. The weighing sensor according to claim 16, wherein the coupling rod is loaded in compression.

* * * * *